Patented Sept. 18, 1928.

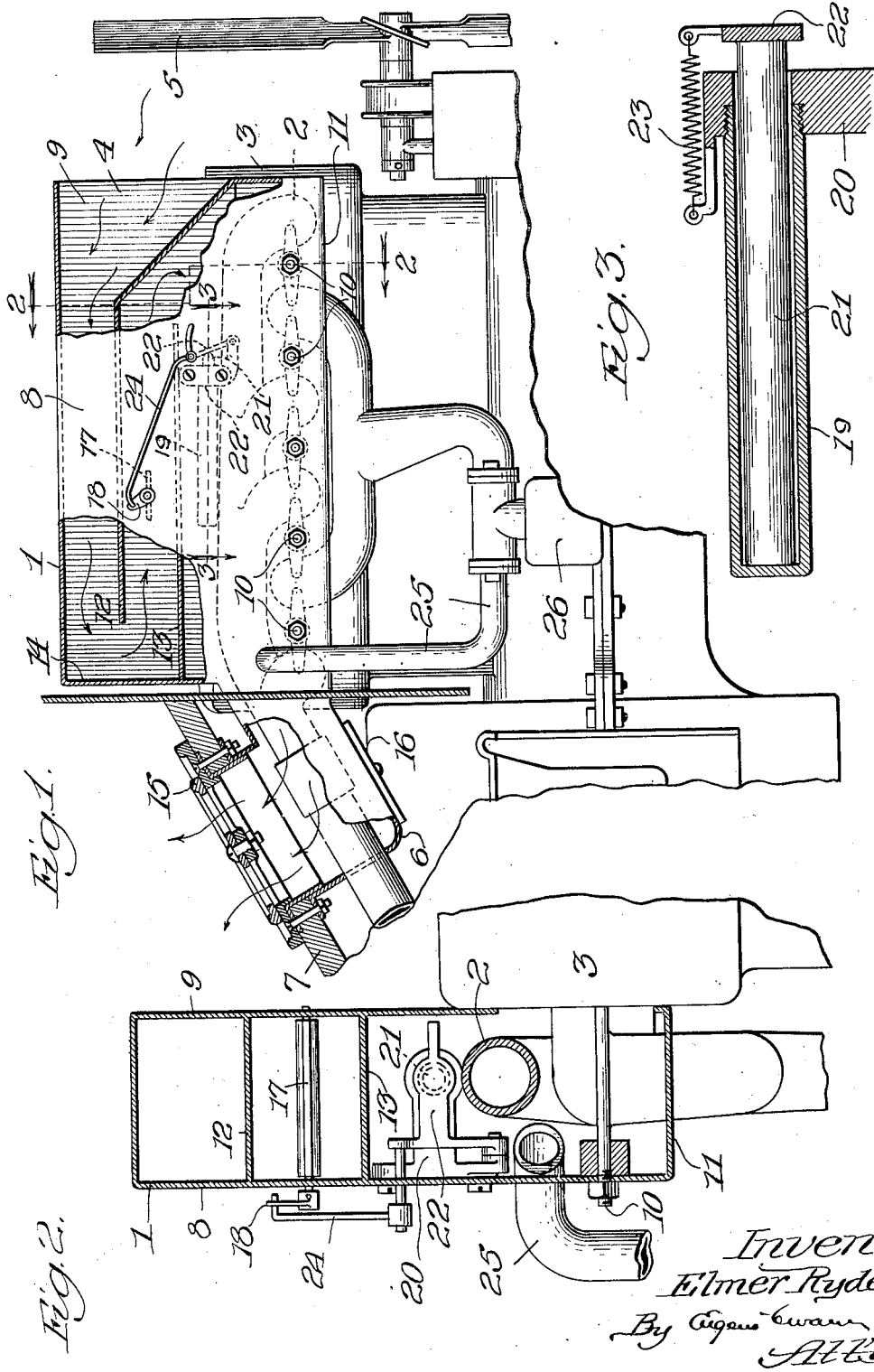

1,684,599

UNITED STATES PATENT OFFICE.

ELMER RYDER, OF BERWYN, ILLINOIS.

MOTOR-VEHICLE HEATER.

Application filed December 9, 1925. Serial No. 74,304.

This invention relates to motor car heaters and more particularly to heaters which are applied to the exhaust manifolds of the engines of the cars for heating by the manifolds the currents of air passing through the heaters.

Heretofore, such heaters as generally constructed have a straight uninterrupted passageway through the heater casing from front to rear. The exhaust manifold is located in this passageway and usually extends lengthwise thereof. In cold weather, as in the winter, cold air is delivered into the car through the heater when first starting the motor or when the parts are cold due to the fact that no provision is made to close the heater casing to the passage of air at that time. Consequently, cold air is delivered into the car instead of heated air as required when the engine is first set in operation or when the parts are cold or below a temperature necessary to heat the air for car warming purposes.

In some types of motors the exhaust and intake manifolds are closely arranged on the same side of the motor, while in other types of motors the intake manifolds have portions at the exhaust manifolds to provide the so-called "hot spots" to aid in the carburation of the explosive mixture. With both types of motors the heater casings enclose the exhaust manifolds and the adjacent parts of the intake manifolds so that if cold air is allowed to flow over the parts the efficient operation of the engine is affected. With straight passageways through the heaters as heretofore made, the passage of cold air over the manifolds, especially when operating the motors when cold, chills the manifolds as well as these "hot spots" and retards carburation of the fuel mixture. This affects engine performance and has been an objection to the use of manifold heaters on many cars.

My improved heater is so constructed that the objections above are overcome. In my heater, a damper is located in the conduit or passageway in advance of the exhaust manifold for opening and closing the conduit. This damper is actuated by a theremostat operating in response to the temperature in the conduit at the exhaust manifold so as to close the conduit when the parts are cold and open the conduit when the parts are warm. By this means the conduit is closed to the passage of any appreciable amount of cold air when the parts are cold, thereby allowing for a rapid heating up of the heater and preventing the discharge of cold air into the car through the heater as heretofore. The conduit through the heater is made tortuous or divided into communicating sections so that there is no straightaway passage for the air through the heater as heretofore. This allows the heater to pre-heat the air before it reaches the exhaust manifold, so that only heated air is delivered into the car.

In opening and closing the heater conduit automatically in response to the temperature in the conduit at the exhaust manifold, only heated air will be supplied to the car. This feature is also important in connection with carburation of the gaseous mixture. When the parts are cold the conduit is closed to the passage therethrough of any appreciable amount of cold air, so that the exhaust manifold may heat up rapidly and transfer its heat to the associated parts of the intake manifold for quick starting of the engine and efficient operation thereof earlier than made possible with heaters as heretofore made.

The invention consists further in the matters hereinafter described and claimed.

In the accompanying drawings—

Fig. 1 is a view showing a heater of my invention installed over an exhaust manifold and connected with the floor-boards of a car;

Fig. 2 is an enlarged vertical sectional view taken on line 2—2 of Fig. 1; and

Fig. 3 is an enlarged horizontal sectional view through the thermostat and taken on line 3—3 of Fig. 1.

The heater 1 of my invention is applied over an exhaust manifold 2 of an automobile engine 3. The heater has a conduit extending therethrough with its inlet opening 4 at the front of the heater so as to receive air currents direct from the fan 5, as usually employed with engines of this kind. The outlet end 6 of the conduit opens upward through the floor-boards 7 of the car so as to deliver heated air into the same.

The heater 1 is in the form of a casing, preferably made of sheet metal. It extends above the exhaust manifold 2 and has its side walls 8, 9 on opposite sides of the manifold with the wall 9 against the engine block, as shown in Fig. 2. The outer side wall 8 is provided with openings to receive the outer ends of the studs 10 of the manifold clamps so as to support the heater and enable it to be clamped thereon. The lower end of the wall 8 has a number of inturned flanges 11 to extend to the engine block between the manifold pipes so as to provide a closure for the casing from below.

The portion of the casing above the manifold 2 is divided into sections by horizontally disposed partition walls 12, 13. These walls extend lengthwise of the casing from the respective end walls 14, 14 and terminate short of the ones toward which they extend, so as to provide a tortuous conduit through the casing. The manifold 2 is in the last section of the conduit immediately below the wall 13. This last section opens into the delivery end of the heater, and a movable register 15 is associated with this end at the floor-boards of the car for controlling the discharge of heated air into the car from the heater. This delivery end 6 is also provided in its under side with one or more openings controlled by a damper plate 16. This plate is usually open when the register 15 is closed, so as to allow for a free circulation of air over the exhaust manifold when the heater is not in use and the conduit is open.

The conduit through the heater is provided with a thermostatically actuated damper 17 for controlling the passage of air through the conduit. This will prevent cold air from being delivered into the car at the time of starting the motor when the parts are cold due to the fact that the damper at such time will be closed and no appreciable amount of air is allowed to flow through the heater. With the damper closed and the exhaust manifold enclosed by the heater casing, an opportunity is afforded for a rapid heating of the manifold to quickly warm the heater.

The damper 17 is preferably in the form of a plate and it is located in the conduit in advance of the manifold 2. To secure this I locate the plate in the section of the conduit between the partition walls 12 and 13. The plate is trunnioned in the side walls 8, 9 of the heater casing and the outer trunnion is provided with a crank arm 18, as shown in Figs. 1 and 2. The thermostat is in the section of the conduit in which the exhaust manifold 2 is located and any suitable form of thermostat may be employed.

In the drawings, I have shown a construction comprising a copper tube 19 closed at one end and having its other end threaded in a bracket 20 secured to the inside of the casing wall 8 by screws or other means, as shown in Fig. 2. A porcelain rod 21 is located in the tube 19 and has its inner end in direct contact with the closed inner end of the tube. The other end of the rod extends from the tube and through an opening in the bracket 20, as shown in Fig. 3, and there engages a lever 22 pivoted at its lower end on the bracket 20, as shown in Fig. 2. This lever is constantly held against the outer end of the rod 21 by a coiled spring 23 fastened at one end to the lever and at the other end to a suitable lug on the bracket, as shown in Fig. 3.

When the parts are cold, the damper 17 is closed. Under the influence of heat given off by the manifold 2, the tube 19 elongates and the rod 21 follows by reason of the spring pressure on its outer end. This allows for movement of the lever 22 toward the tube and by a link 24 connecting the free end of the lever with the crank arm 18, the damper 17 is moved into open position. The extent to which the damper opens is of course dependent upon the degrees of heat within the heater. The damper naturally opens gradually as the temperature of the heater rises and thus prevents cold blasts of air flowing over the exhaust manifold and into the interior of the car.

By dividing the conduit into sections one above the other with the heating element in the last section, the incoming air is preheated before reaching the exhaust manifold by being caused to first travel through the heated upper sections of the conduit. The temperature of the air rises as it approaches the exhaust manifold so that by the time the air reaches the car it is heated sufficiently for car warming purposes.

To supply heated air to the intake of the carbureter, which is especially desirable in the winter and at other times when the outside air is cold, I use in connection with the heater 1 a pipe 25. This pipe is shown in Fig. 1 and opens at its upper end into the last section of the conduit through its wall 8. The pipe extends into the casing and has its other end connected with the air intake of the carbureter 26, as shown in Fig. 1. The end of the pipe in the casing is cut off at an angle to intercept the flow of heated air and direct the same into the conduit for delivery to the intake end of the carbureter. This feature of my invention is particularly important when used in conjunction with the thermostatically controlled damper 17. When the parts are cold the damper is closed and prevents any appreciable amount of cold air flowing over the exhaust manifold. The air within the last section of the conduit at such time is allowed to rapidly rise in temperature from the heat generated by the exhaust manifold, and with such air immediately delivered to the carbureter a more efficient operation of the engine is gained.

The advantages of my invention are as heretofore pointed out.

The details shown and described may be variously changed and modified without departing from the spirit and scope of my invention.

I claim as my invention:

1. A motor vehicle heater having a casing adapted to be applied over the exhaust manifold of the vehicle engine, said casing having a cold air intake and a hot air outlet, partition means dividing the casing into a plurality of passages communicating with each other and with the intake and outlet, respectively, to increase the length of travel of the air through the casing, a damper in one of said passages for controlling the flow of air through the casing, and a thermostat responsive to the temperature of the air in the casing, and means connecting the thermostat with the damper for automatically opening and closing the same.

2. A motor vehicle heater having a casing adapted to be applied over the exhaust manifold of the vehicle engine, said casing having a cold air intake and a hot air outlet, partition means dividing the casing into a multiplicity of communicating passages arranged one above the other with the intake and outlet associated with the upper and the lowermost of the passages, respectively, to increase the length of travel of the air through the casing, a damper in one of the upper passages for controlling the flow of air through the casing, a thermostat in the lowermost passage and responsive to the temperature of the air therein, and means connecting the thermostat with the damper for automatically opening and closing the same.

3. A motor heater having a casing adapted to be applied over the exhaust manifold of the vehicle engine, said casing having a cold air intake and a hot air outlet, partition means dividing the casing into a multiplicity of communicating passages arranged one above the other with the intake and outlet associated with the upper and the lowermost of the passages, respectively, to increase the length of travel of the air through the casing, a damper in one of the upper passages for controlling the flow of air through the casing, and a thermostat carried by the casing in the lowermost passage and responsive to the temperature of the air therein, and means connecting the thermostat with the damper for operating the same, said connecting means being exterior of the casing.

In testimony whereof I affix my signature this 4th day of December, 1925.

ELMER RYDER.